Dec. 29, 1953  C. A. GREINER ET AL  2,663,900
METHOD FOR REMOVING HEADS FROM BODIES OF SHRIMPS
Filed Jan. 4, 1950  6 Sheets-Sheet 2

Fig. 2.

INVENTORS
CHARLES A. GREINER,
ELBERT F. GREINER,
BY
*H. B. Willson & Co.*
ATTORNEYS Dec. 29, 1953     C. A. GREINER ET AL     2,663,900
METHOD FOR REMOVING HEADS FROM BODIES OF SHRIMPS
Filed Jan. 4, 1950     6 Sheets-Sheet 6

INVENTORS
*Charles A. Greiner,*
*Elbert F. Greiner,*
BY
*A. B. Willson & Co.*
ATTORNEYS

UNITED STATES PATENT OFFICE 2,663,900

METHOD FOR REMOVING HEADS FROM BODIES OF SHRIMPS

Charles A. Greiner and Elbert F. Greiner, New Orleans, La.

Application January 4, 1950, Serial No. 136,774

2 Claims. (Cl. 17—45)

Our invention relates to the preparation of shrimps for the market and more particularly to the removal of the heads from the bodies of shrimps.

In the marketing of shrimp it has been customary to separate the heads from the bodies or tail portions promptly after they are removed from the water; and in the past that has usually been done by hand, although machines for doing it have been proposed.

The structure of a shrimp is such that the head portion is connected by a weak joint to the body or tail portion which contains the edible meat. Further, the head portion is relatively soft and easily crushed as compared to the much firmer body or tail portion containing the muscle meat; and, hence, the latter may be subjected to a very much higher pressure without being mutilated or damaged. It may also be noted that the body of a shrimp is longitudinally tapered, being much thicker at its head end than at its tail end, and that from the latter there projects a fan-like tail which forms a part of the shell that encloses the meaty part of the body. From the head there projects not only a number of feet and feeding members but two antennae or feelers which are usually as long as or longer than the entire body and head portions of the shrimp.

We have discovered that by simply passing shrimp between two opposed pressure rolls of suitable construction many of the shrimp will have their heads completely severed from their body portions by the squeezing pressure of the rolls. We have employed a pair of rolls of approximately two inches in diameter made of sponge rubber, one of the rolls being driven and the other being subjected to a suitable pressure so that as the shrimp passes between the opposed cylindrical surfaces its head will be crushed and the weak joint between its head and the body will be severed, while the firmer body portion will cause the cylindrical surfaces to be deformed to permit the body portion to pass through without being mutilated. While it is desirable to feed the shrimp between the rollers in the direction of its length, that is, either head first or tail first, the rotation of the contacting rolls or rollers will tend to turn the length of the shrimp to a position at right angles to the length of the rolls. Such turning movement of the shrimp will not take place, to any substantial extent, if the longitudinally curved top or back of the shrimp is first presented to the bight or crotch of the rolls, and in such case the shrimp will pass between the two rolls without, in most cases, having its crushed head separated from its body; but when either the tail or the antennae or projecting parts on the head are first gripped by the rolls, the peripheral speed of the latter will tend to turn the shrimp or pull it around either tail first or head first. Since those thin parts, the flat tail shell and the antennae or feelers, will not cause the resilient surfaces of the rolls to be deformed, while the thicker body of the shrimp will, the peripheral speed of the cylindrical surfaces of the rolls will be greater than the peripheral speed of the depressed portions which grip the thick body. Consequently, the rolls have a tendency to turn the shrimp to a lengthwise position as it moves between the rolls. It is the squeezing pressure across or substantially across the weak joint or connection between the head and body of the shrimp that causes the head to be popped off or separated from the body when the shrimp is passed between two opposed resilient and deformable pressure rolls.

We have further discovered that in machines of small and medium capacity beheading or decapitating of the shrimps may be accomplished by the use of two or more sets or pairs of such pressure rolls so arranged that the rolls of next adjacent pairs will simultaneously engage a shrimp and so driven that a roll or rolls of the first set will rotate at a slower speed than the next adjacent set or pair. The shrimp being thus simultaneously gripped between the rolls of two sets driven at differential speeds will have their head portion pulled or torn from their body portion, as it passes through the nips of the rotary surfaces of next adjacent pairs of rolls.

The present application claims the last mentioned method or process of deheading shrimps by applying to the opposite sides of the shrimp at points spaced lengthwise of the shrimp progressive rolling yieldable or resilient pressure, the speed of the rolling pressure at one point being greater than the speed at the other point. The first mentioned discovery of deheading shrimps by applying to opposite sides of the shrimp substantially lengthwise progressive rolling resilient pressure is claimed in our copending application Serial No. 158,514 filed April 17, 1950.

The primary object of our invention of this application is the provision of a method or process of deheading shrimps which will be rapid and effective so that a great saving in time and labor will be accomplished.

The invention also contemplates the provision of an apparatus or machine which may be used in the practice of our new method.

Further objects and advantages will hereinafter appear, the invention residing in the new procedures and in the new structures, combinations and arrangements of parts set forth in the following description, defined in the appended claims and shown in the accompanying drawings, in which:

Figure 3:
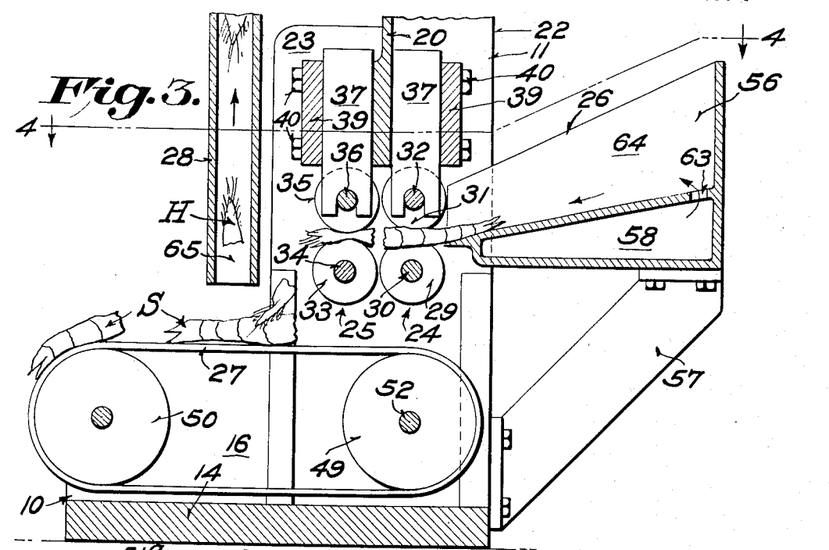
Fig. 3 is a detail front to rear section through the lower portion of the same machine.
Figure 4:
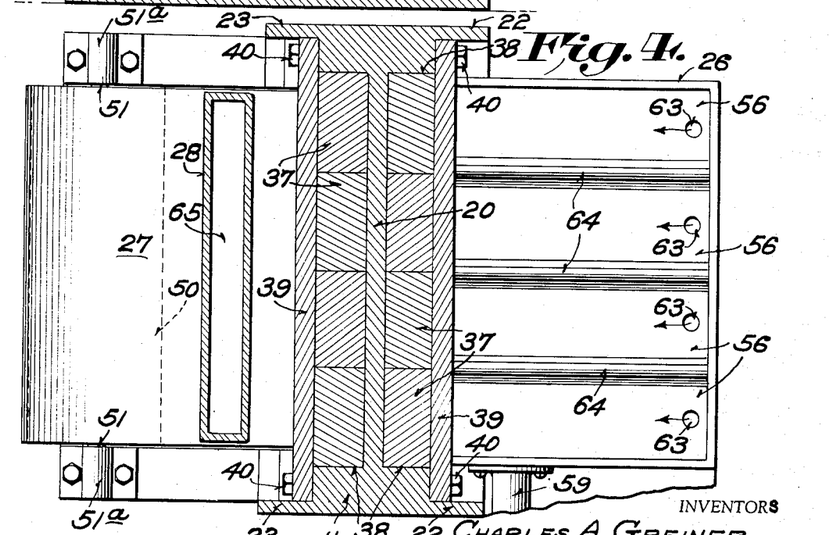
Fig. 4 is a horizontal section taken substantially in the line 4—4 of Fig. 3.
Figure 5:
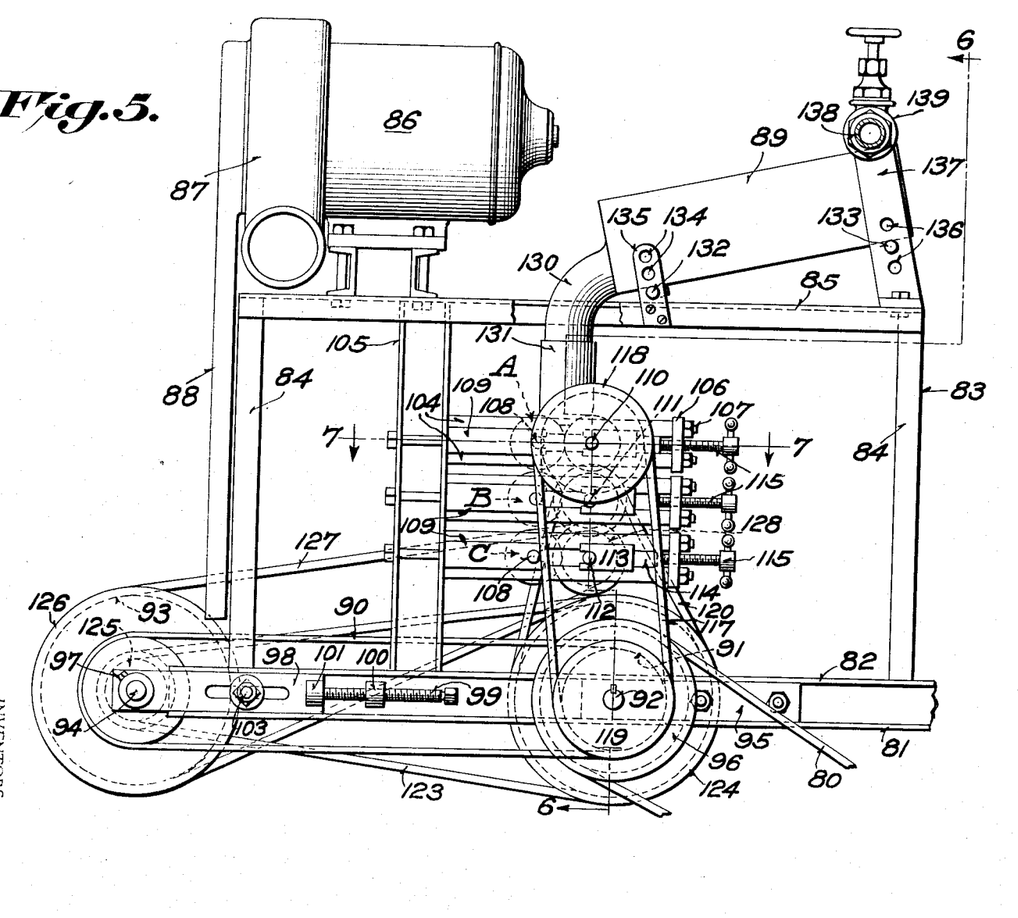
Fig. 5 is a side elevation of another form of machine for practising the invention.
Figure 6:
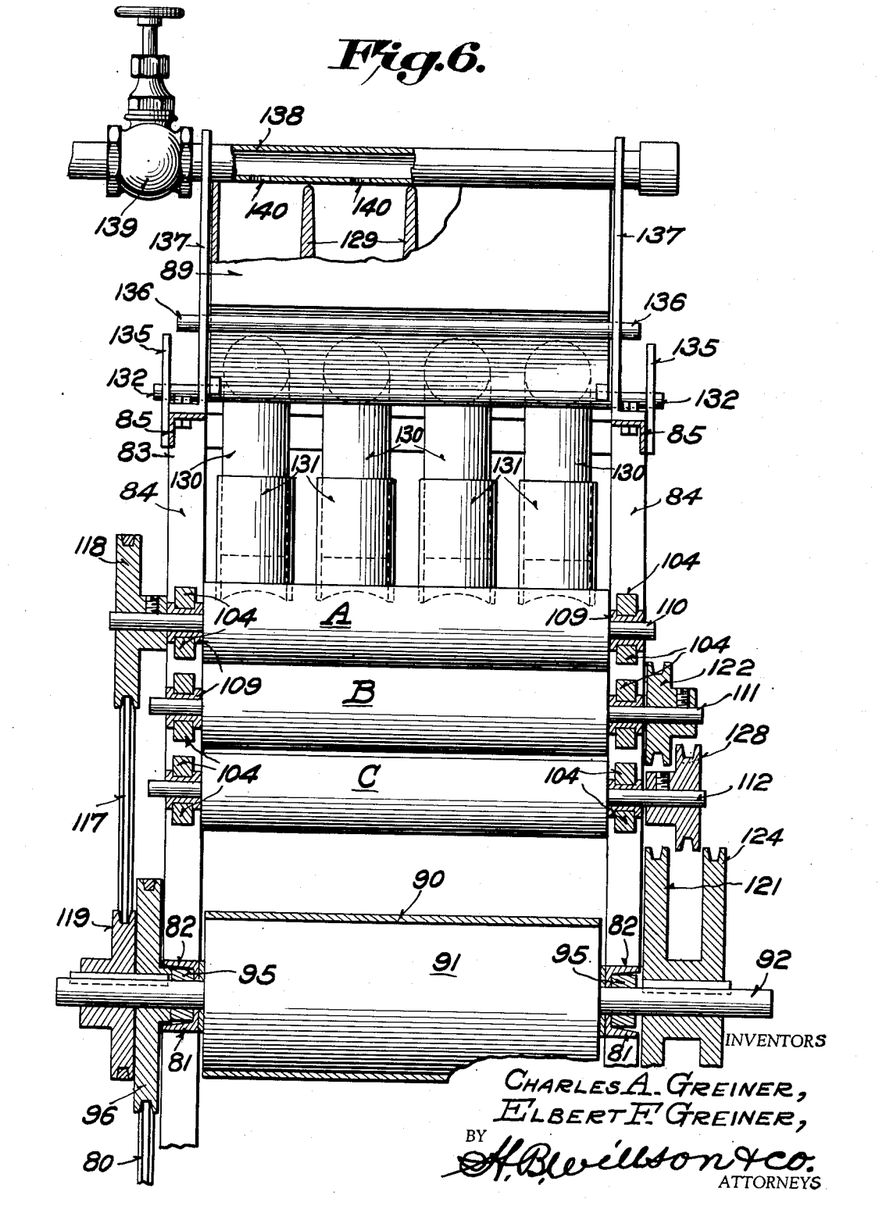
Fig. 6 is a vertical transverse section of the machine of Fig. 5.
Figure 7:
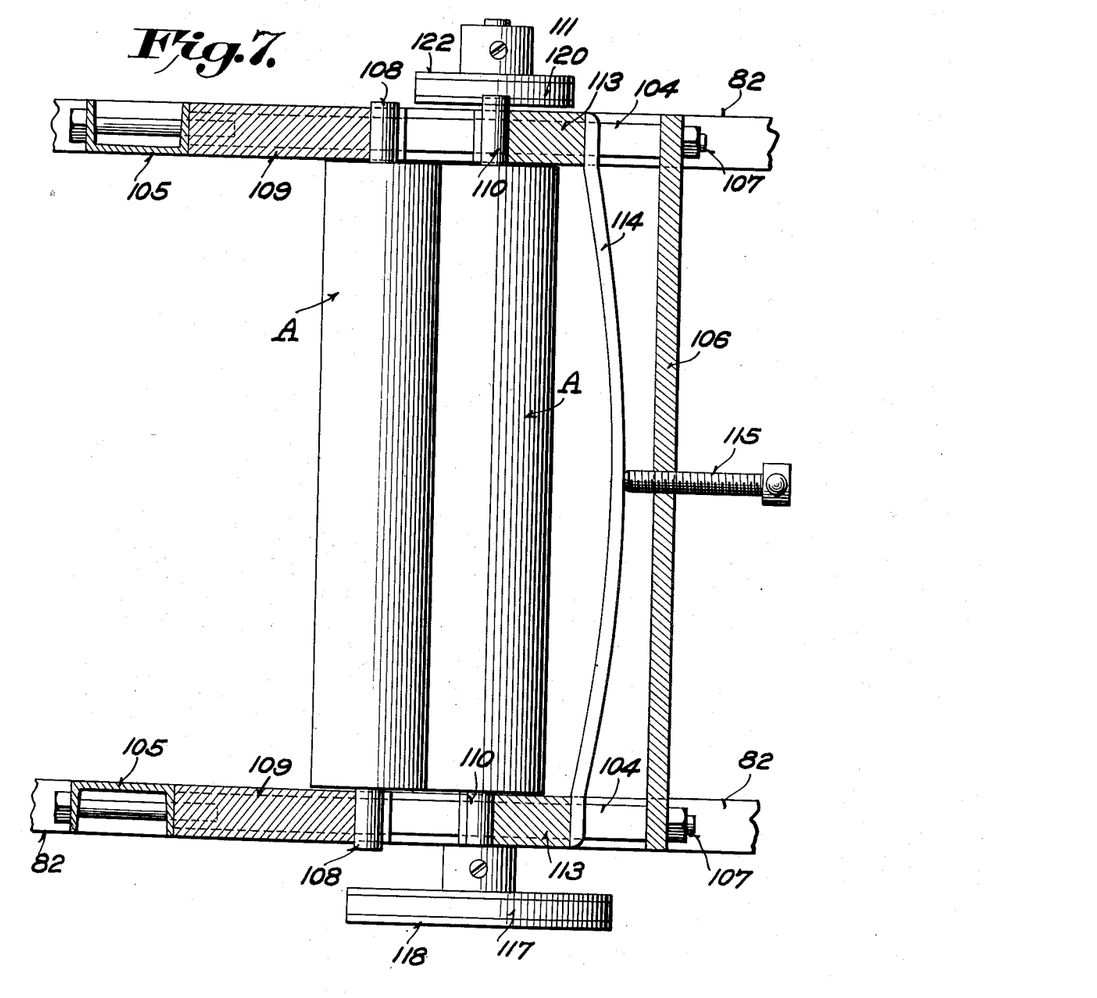
Fig. 7 is a detail section taken substantially on the line 7—7 of Fig. 5.

Referring more in detail to the drawings, it is to be noted that in the machine shown in Figs. 1-4, inclusive, two sets of rolls are shown and the shrimps are fed to them in a horizontal direction, while in the machine of Figs. 5-7, inclusive, three sets of rolls are used and the shrimps are fed to them downwardly in a vertical direction.

The machine of Figs. 1-4 has a main frame preferably formed in two cast sections 10 and 11 of corrosion resistant metal connected by screws or other fastenings 12. The frame may be secured to a suitable table or stand by means of apertured lugs 13. The lower section 10 comprises a rectangular base 14 from which rises two suitably shaped side walls 15 and 16. The thicker wall 16 has a portion cored to form a chamber 17 for gearing hereinafter described, the chamber being closed by a cover and bearing plate 18 fastened by machine screws 19. The upper frame section 11, which has a rounded top, comprises a web portion 20 from the opposite faces of which project suitably shaped front and rear flanges 22 and 23 that form side plates.

Mounted on the frame as best shown in Fig. 3 are two pairs 24 and 25 of shrimp tearing or beheading rolls, a shrimp and water feeding devise 26 disposed at the front of the machine, an endless conveyer belt 27 disposed beneath the rolls to receive the several parts of the shrimp and move them rearwardly, and a suction device 28 disposed over the conveyer to separate the heads and small or light-weight parts from the meat containing bodies or tails before the latter are discharged from the machine.

The first set 24 are the slow speed rolls which receive the shrimps usually head first from the feeding means 26, while the second set 25 of rolls rotate at a faster peripheral speed and are positioned horizontally in rear of the first set, all of the rolls in this embodiment of the invention being preferably less than two inches in diameter and the two sets being spaced so that even the smallest shrimp will be simultaneously engaged by the rolls of both sets as it passes horizontally and lengthwise between the rolls. It will be noted that the diameter of the rolls and the lateral spacing of the axes of the rolls of the two pairs is such that as the shrimp passes in the direction of its length through the nips of the rotary surfaces driven at different rates of speed there will be a pulling or tearing action on the shrimp to cause its head and body portions to be severed. All of the rolls are made of or covered by a soft and pliable or flexible material which has some resilience or elasticity so that the surfaces of the rolls will be temporarily deformed by at least the firmer portions of the shrimp as the latter pass between them. We have found in this embodiment of the invention that sponge rubber with a "so called skin" on the cylindrical surface of the roll is highly satisfactory in accomplishing the desired result. These sponge rubber cylinders are suitably secured to metal shafts, the shaft of the one roll of each pair being driven while the shaft of the opposed roll may shift laterally, or when the rolls are superimposed, rise and fall according to the size of the shrimps between the two opposed rolls. However, the upper rolls of each pair of superimposed rolls is placed under suitable tension by weight or spring means as later explained, so that the pair of rolls will have sufficient gripping action on the shrimp to accomplish the desired result without the shell-covered meaty portions being mutilated or damaged. When no shrimps are between the rolls of each pair, their surfaces will be in contact; and the gripping action is due to both the inherent elasticity of the sponge rubber and the pressure applied to the laterally yieldable or shiftable roll although the roll is made shiftable primarily to allow a hard foreign object to pass.

Figure 2:
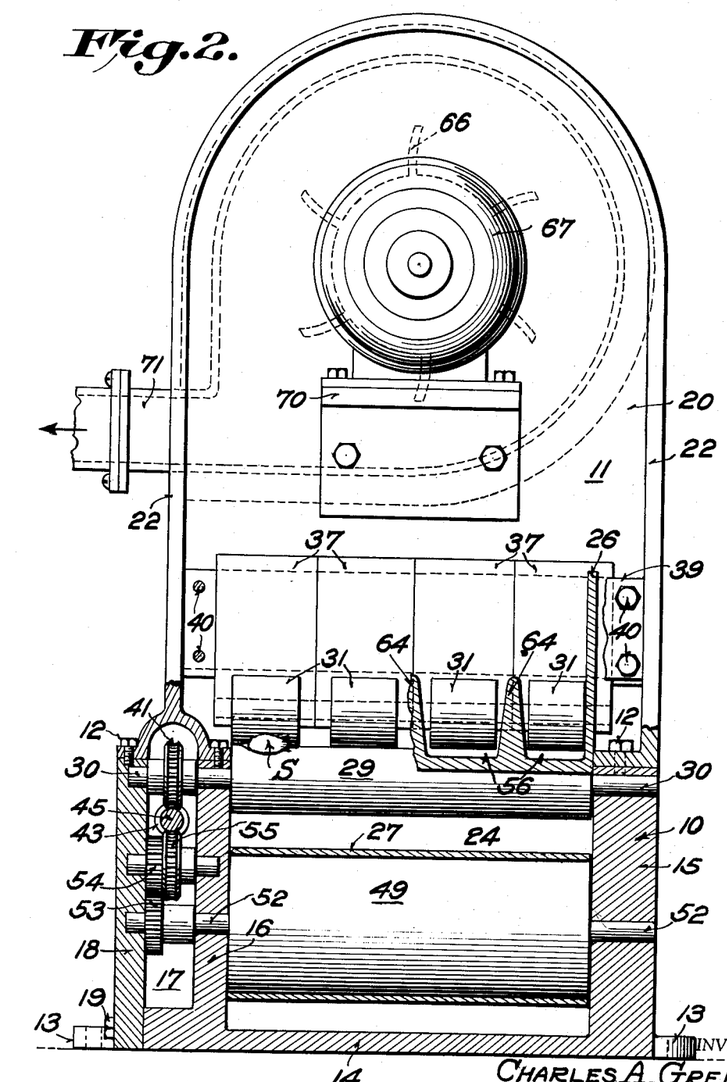
Fig. 2 is a view looking toward the front of the machine of Fig. 1, the upper part being in elevation and the lower part in section with parts broken away.

As shown in Figs. 2 and 3 the first set 24 consists of a single lower roll 29 on a shaft 30 and a plurality of closely spaced upper rolls 31 on short shafts 32 which are normally axially alined. While we have obtained satisfactory results by using a single or one-piece upper roll, we may make the upper roll member sectional as shown, using four short rolls and provide the feeder 26 with means for guiding the shrimp head first or tail first beneath the short roll sections as presently explained. The rear or second set 25 similarly comprises a driven lower roll 33 on a shaft 34 and a series of short rolls 35 on shafts 36. The short rolls 31 and 35 are disposed in the recessed lower ends of vertically slidable blocks 37 arranged in two transverse rows on opposite sides of the lower part of web portion 20. The forked lower ends of these blocks have inverted U-shaped bearing notches which receive the projecting ends of the shafts 32 and 36 as seen in Figs. 2 and 3, so that said blocks form both bearings and tensioning weights for the short rolls. The rectangular blocks 37 of each row are in free sliding contact with each other and the endmost block is guided by shoulders 38 as seen in Fig. 4, the blocks being retained in rows by transverse plates or bars 39 secured at their ends by screws 40.

Figure 1:
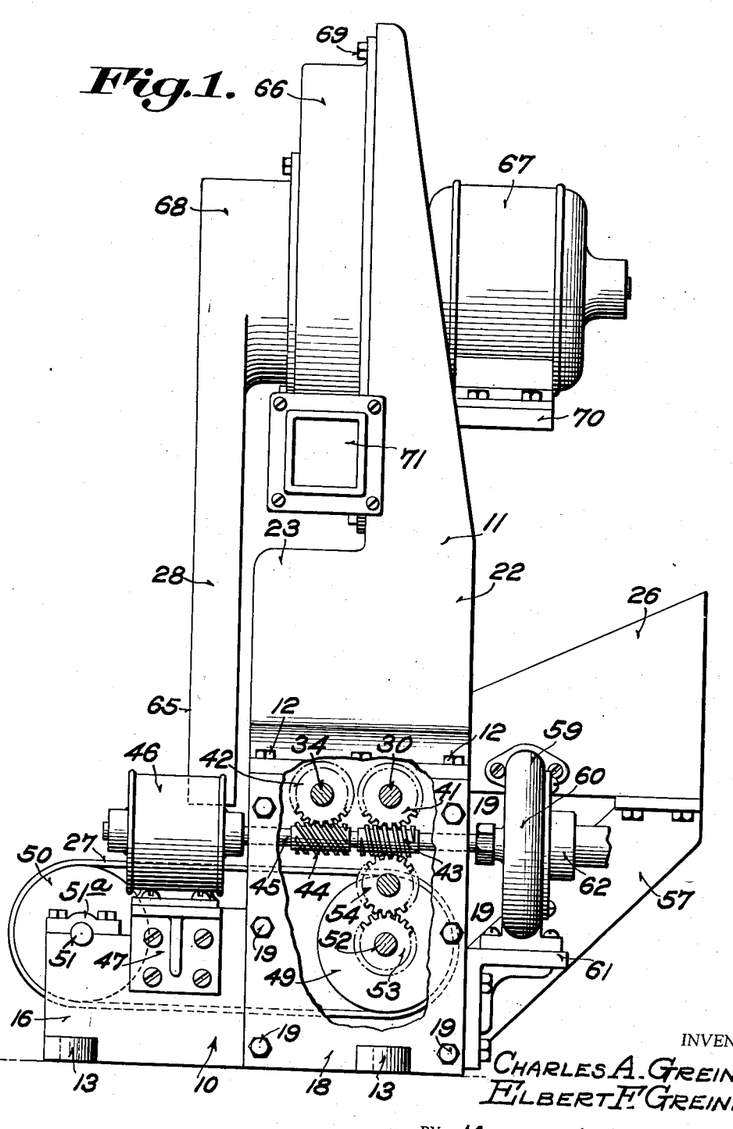
Figure 1 is a side elevation with parts broken away and in section, of one form of machine for practicing our invention.

The differential speed drive for the lower rolls is shown in Figs. 1 and 2. The shafts 30 and 34 are journaled in suitable bearings in walls 15 and 16, and one end extends into the chamber 17. Worm gears 41 and 42 are fixed respectively to these ends of shafts 30 and 34, and mesh respectively with two worms 43 and 44 fixed to a forward and rearwardly extending drive shaft 45 which may be the armature shaft of an electric motor 46. Worm 43 has a single flute, while 44 has four flutes so that due to the difference in pitch of the two worms the shaft 34 will be driven four times faster than the shaft 30. The motor 46, which is supported on a bracket 47 projecting laterally from wall 16, may have a speed of 1750 R. P. M. The ratio between the gears 43 and 41 is about 20 to 1 and, hence, the slower roll 29 will have a speed of about 87 R. P. M., while the faster roll 33 will turn at about 350 R. P. M.; but it will be understood that these speeds may be increased.

The endless conveyer belt 27 may be of canvas, composition material or metal, either perforated or imperforate. When of metal, it is made of wire mesh fabric and may be of transverse wire coils closely interlocked similar to one well known form of wire fencing. The belt passes around two drums or rollers 49 and 50. The shaft 51 of the roller 50 is mounted in bearings 51a which can be made adjustable to tighten the belt. Roller 49 is driven by fixing it on a shaft 52 which at one end extends into the chamber 17 and has fixed to it a toothed gear 53. The latter is in mesh with a similar gear 54 integral with a worm gear 55 which is driven by the worm 43 as seen in Fig. 1. The shaft for the gears 54 and 55 has bearings in the wall 16 and the plate 18, which latter may also have bearings for the shafts 30 and 52.

The shrimp feeding means 26 comprises an open top hopper or trough 56 into which the shrimps are deposited, and means for introducing water into it to flume the shrimp down to the slow speed rolls 29, 31. The trough or flume 56 is preferably in the form of a casting which may be supported by inclined brackets 57 from the frame section 10. The bottom of the trough is inclined downwardly and inwardly or rearwardly, and beneath it is formed a water distributing chamber or compartment 58 having an inlet on one side to which is connected the discharge 59 from a centrifugal water pump 60. The casing of the pump is secured to a supporting bracket 61 fastened to front of the section 10 on one side of the latter, and the rotor or impeller of the pump is fixed to a projecting end portion of the drive shaft 45. The pump inlet 62 may be suitably connected to a source of water supply so that when the machine is in operation, water will be pumped into the chamber 58 and will discharge therefrom through openings 63 in the bottom of the feeding trough. In order to effectively guide the shrimps end first to the rolls 29, 31, the interior of the trough is divided into four channels by forwardly and rearwardly extending partitions 64 which may extend the full height of the longitudinally tapered outer side walls of the trough. The latter is thus divided into four troughs or channels, one for each of the roll sections 30. A water inlet 63 is at the upper end of each of these channels to discharge a stream or sheet of water down each section to not only aid in feeding the shrimps between the rolls but to wash and clean the rolls.

The suction means 28 for removing the severed heads and small particles from the body or tail portions before the latter pass off of the conveyer 27 into a suitable receptacle, comprises a vertically disposed suction nozzle 65 which is flat or elongated transversely of the machine and is of a width to extend entirely across the belt 27 at the rear portion of the machine. The nozzle depends from the inlet eye of an exhaust fan or blower 66 driven by a separate electric motor 67. The lower open end of the nozzle is suitably spaced above the belt so three inches of suction will effectively lift the heads and other small severed parts of the shrimps, such parts being indicated at H in Fig. 3, while the body or tail portions are designated S. The upper end of the nozzle 65 is reduced in width and terminates in a flanged circular discharge 68 screwed or bolted over the eye of the suction blower 66. The casing of the latter is secured as at 69 to the rear face of the upper portion of the web 20. The rotor of the blower 66 is on the shaft of the motor 67 which is supported by an angle bracket 70 secured on the front of web 20. The blower discharge 71 may be piped to a suitable waste receptacle.

From the foregoing it will be apparent that when the machine is in operation and shrimps are dropped into the channels of the feeding trough, they will be flumed down the channels usually head-first or tail-first and will be gripped between the slow speed rolls 29, 31 and moved rearwardly by them until the advanced portions are gripped by the high speed rolls 33, 35. It was discovered that when a machine constructed as shown in Figs. 5, 6 and 7 of the drawings was operated, the pressure of the rolls 29, 31 will squeeze the heads off of many of the shrimps and with respect to many others the heads will be partially severed so that the pulling action of the faster rolls will cause practically all of the shrimp to be beheaded. The severed parts will drop upon the belt 27 and be carried under the suction nozzle so that the heads and waste parts will be separated from the heavier body or tail parts. As above noted, the water not only facilitates the feeding of the shrimps but causes the several rolls to be washed and kept relatively clean. The weighted bearing blocks 37 are made to create the desired pressure on the upwardly yieldable rolls 31, 35 so that the meaty bodies will not be damaged. Different sets of blocks 37 of different weights may be used to vary the pressure.

The machine of Figs. 5–7, inclusive, has some advantages over the above described machine, since it takes advantage of the effect of gravity in feeding the shrimps downwardly and also the flow of water downwardly from the feed trough is carried over all of the rolls to more effectively clean them of all shrimp particles. In addition, the third set of rolls driven faster than the second set eliminates any possibility of a shrimp passing through the machine without being deheaded. As seen in Figs. 5 and 6 the main frame is made of channel and angle metal bars and is adapted to be supported on a suitable stand or table (not shown) that may support in its lower portion an electric motor and speed reduction gearing for driving a main drive belt 80. The frame has a lower or base portion 81 which includes suitably connected U-shaped side bars 82, the channels of which face outwardly. Rising from the portion 81 is an open rectangular upper frame 83 including corner uprights 84 which support a top portion 85. The latter suitably supports at its rear an electric motor 86 directly connected to the rotor of a suction blower 87 from the inlet eye of which depends a suction nozzle 88 corresponding to the nozzle 65. At the front of the top portion 85 is supported a shrimp and water feeding trough 89 corresponding to the feeder 26.

The three sets of gripping or squeezing rolls are supported across the mid portion of the frame 83 beneath the discharge end of the feeder 89 and above the forward end portion of an endless conveyor belt 90 corresponding to the belt 27. The belt 90 passes around a driving roller 91 keyed to a main drive shaft 92 and a roller 93 loose on a shaft or axle 94 which is adjustable to tighten the belt. The drive shaft is journaled in bearing blocks 95 secured in the channels of the side bars 82 and has keyed to it a pulley 96 to receive the V-belt 80. Shaft 94 is fixed at 97 in the ends of slotted plates 98 slidable in the channels of the bars 82 and projecting beyond the rear ends of the latter. Adjusting screws 99 pass through threaded openings in lugs 100 in the channels 82 and thrust against lugs 101 on the plates to slide the latter rearwardly to tighten the belt. Clamping bolts 103 in the channels pass through the slots of the plates to clamp the latter in adjusted positions.

The three pairs or sets of rolls designated A, B and C in Fig. 5 are vertically one above the other, the upper rolls A being the slow speed rolls and correspond to the front rolls of the first form. The intermediate rolls B correspond to the rear rolls of the first form and are driven faster than the upper rolls. The lower-most rolls C are driven at a greater speed than the second or intermediate rolls. Each of the three sets consists of one roll which is shiftable toward and from the other and of one driven roll and one non-driven roll, but while in the first form the non-driven roll is shiftable, in this second form the shiftable roll is the driven one. Further, in this second form both rolls of each pair are one-piece or continuous rolls instead of one being in four sections as in the first form. In this second form the bearing blocks for the driven and shiftable roll of each set are spring pressed to place the roll under the desired tension which may be more easily varied than in the first form.

The bearings for the rolls of each set are between vertically spaced horizontal bars 104 arranged in vertically spaced pairs and projecting forwardly from suitable posts 105 extending between the lower and upper frames 81 and 85 respectively at each side of the machine. Each of the horizontally opposite pairs of bars 104 have their forward ends connected to a plate 106 which extends horizontally across the machine and is secured to the ends of said bars 104 as at 107. The ends of the shafts 108 of the non-shiftable rolls of each set rotates in bearing notches at the ends of stationary blocks 109. The shafts 110, 111 and 112 of the three shiftable rolls have their ends rotatable in bearing notches in the rear ends of bearing blocks 113, also positioned between the pairs of bars 104 and slidable therebetween. Both the blocks 109 and 113 have their upper and lower edges formed with channels or grooves to receive the bars 104, as seen in Fig. 6. The blocks 113 of each of the shafts 110, 111 and 112 are spring pressed rearwardly by leaf or bar springs 114, which engage them as seen in Fig. 7. Adjusting screws 115 threaded through central openings in the connecting bars 106 thrust against the center portions of springs 114 for the purpose of varying the tension of the shiftable roll of each set.

The drive for the slow speed roll shaft 110 is by a V-belt 117 passing around a pulley 118 keyed to that shaft and a pulley 119 of the same size keyed to the main drive shaft 92. The drive for the shiftable roll shaft 111 of the second set B is by a V-belt 120 from a large pulley 121 keyed to main shaft 92 to a small pulley 122 keyed to shaft 111. The drive for shaft 112 of the shiftable roll of the highest speed set C is by a V-belt 123 from a pulley 124 keyed to the main shaft 92 to a small pulley 125 loose on axle 94 and integral with a larger pulley 126 which is connected by a V-belt 127 to a pulley 128 keyed to the roll shaft 112. By these driving connections the rolls A will be rotated at the speed of the main shaft 92, the rolls B at a speed three times greater than the A rolls, and the rolls C at a speed three times that of the B rolls. Obviously, these speeds may be varied as well as the driving means, but we find that when the slow rolls are driven at 125 R. P. M., both the operation and capacity of the machine are satisfactory for small and medium capacity machines.

The feeder 89 is in the form of a rectangular box with an open top and it contains partitions 129 forming four troughs or channels which discharge into the downwardly curved pipes 130 arranged in a transverse row. Slidably adjustable on the pipes are rubber sleeves 131 having their lower ends shaped to direct the shrimps and water between the rolls A at spaced points. The feeder trough or box 89 is supported so that its downward inclination may be varied, and as shown its bottom rests on a pair of vertically adjustable rods 132 and 133. Rod 132 may be positioned in any opposed holes 134 of a row formed in upright brackets 135 secured to the side bars of the frame members 85. Rod 133 may similarly be inserted in rows of holes 136 in brackets 137 rising from member 85. The extended upper ends of the brackets 137 may support a transversely extending water supply pipe 138 controlled by a suitable valve 139. Pipe 138 has in its bottom water discharge openings 140 to direct streams of water into the upper portions of the channels of the trough.

It is believed that the operation and advantages of this second embodiment of the invention will be apparent from the foregoing detailed description.

It will be noted that by our method shrimps may be deheaded by applying to opposite sides of the shrimp progressive rolling yieldable or resilient pressure, the points of application of the pressure being spaced apart a distance less than the length of the shrimp and the speed of the rolling pressure at one point being greater than the speed at the other point. In other words we separate the head from the body of the shrimp by applying to the head and body portions differentially progressive pulling force, since when a shrimp has its head gripped by one pair of rolls and its body gripped by the other pair, a pulling force will be exerted on the shrimp to separate the head from the body. The pulling force will advance along the shrimp and hence be progressive, and since the second pair has a greater speed than the first pair, they will create a greater pull than the pull or holding action of the first pair. This method may be practiced by the use of either of the two illustrated machines and by other apparatus, and even by hand.

When the machine shown in Figs. 5, 6 and 7 of the drawings was built our conception was to dehead the shrimps by the pulling or tearing action of pairs of rolls driven at different speeds, that is, by applying differentially progressive pulling force, but when that machine was operated we discovered that some of the shrimps were deheaded by the crushing action of the first pair of rolls A. After further experiments we found that by making the resilient sponge coverings of the opposed rolls of the proper degree of hardness a very large percent of the shrimps passing between the first pair of rolls would be deheaded. Hence as above stated our first conceived method of deheading by the pulling or tearing action of differentially driven rolls is claimed in this application and our later conception of deheading by the crushing action of resilient rolls is claimed in our application Serial No. 158,514.

It is to be understood that while we have set forth in detail the present preferred means and method of practicing the invention, the latter is not confined to the precise details herein set forth by way of illustrations, since changes and variations may be made by those skilled in the art, without departing from the spirit of the invention or exceeding the scope of the following claims.

What is claimed is:

1. The method of separating the head from the body of a shrimp which comprises applying to the head and body portions of said shrimp differentially progressive pulling force.

2. The method of separating the head from the body of a shrimp which comprises applying to the head and body portions of said shrimp differentially progressive resilient pulling force.

CHARLES A. GREINER.
ELBERT F. GREINER.

References Cited in the file of this patent

UNITED STATES PATENTS

| Number | Name | Date |
|---|---|---|
| 1,723,492 | Ryder | Aug. 6, 1929 |
| 1,814,633 | Ryder et al. | July 14, 1931 |
| 1,835,242 | Ryder et al. | Dec. 8, 1931 |
| 1,867,955 | Ryder | July 19, 1932 |
| 2,034,691 | Bottker et al. | Mar. 24, 1936 |
| 2,262,872 | Whitehead | Nov. 18, 1941 |
| 2,412,357 | Robinson | Dec. 10, 1946 |

FOREIGN PATENTS

| Number | Country | Date |
|---|---|---|
| 270,448 | Great Britain | May 12, 1927 |